(12) United States Patent
Hoser

(10) Patent No.: US 7,293,748 B1
(45) Date of Patent: Nov. 13, 2007

(54) PAINT CAN SUPPORT APPARATUS AND METHOD

(76) Inventor: Kevin R. Hoser, 1299 E. Fowler Dr., Deltona, FL (US) 32725

( * ) Notice: Subject to any disclaimer, the term of this patent is extended or adjusted under 35 U.S.C. 154(b) by 45 days.

(21) Appl. No.: 11/283,460

(22) Filed: Nov. 21, 2005

(51) Int. Cl.
*A47G 23/02* (2006.01)

(52) U.S. Cl. .................. 248/146; 248/125.8; 248/354.5

(58) Field of Classification Search ............... 248/127, 248/146, 354.5, 357
See application file for complete search history.

(56) References Cited

U.S. PATENT DOCUMENTS

| 1,396,445 A | 11/1921 | Loudon |
| 1,609,246 A | 11/1926 | Hamburger |
| 4,223,859 A | 9/1980 | Erickson |
| 4,395,013 A | 7/1983 | Wissinger |
| 5,445,352 A * | 8/1995 | Long ....................... 248/354.5 |
| D421,664 S | 3/2000 | Sherman |
| 6,145,796 A | 11/2000 | McCraney |
| 6,533,227 B1 | 3/2003 | Rom |
| 2006/0202092 A1* | 9/2006 | Johnson ..................... 248/146 |

* cited by examiner

*Primary Examiner*—Ramon O Ramirez

(57) ABSTRACT

A paint can support apparatus includes a post that has a top end and a bottom end. A support assembly is attached to the post adjacent to the bottom end and is configured to support the post in a vertical orientation. A housing has a bottom wall and a peripheral wall that is attached to and extends upwardly from the bottom wall. The peripheral wall has an upper edge defining an opening into the housing and the bottom wall is attached to the top end of the post. A paint can is positioned in the housing and abutted against the bottom wall so that the paint can is supported above a ground or floor surface.

6 Claims, 5 Drawing Sheets

PAINT CAN SUPPORT APPARATUS AND METHOD

BACKGROUND OF THE INVENTION

1. Field of the Invention

The present invention relates to paint can holding devices and more particularly pertains to a new paint can holding device for supporting a paint can above a ground or floor surface that it may be easily accessed by a painter who is in a standing position or on a ladder.

2. Description of the Prior Art

The use of paint can holding devices is known in the prior art. U.S. Pat. No. 4,223,859 describes a device that includes a pole having an upper end including tethers for securing a paint can to the upper end of the pole. Another type of paint can holding device is U.S. Pat. No. 6,533,227 which includes an adjustable base for altering the angle of a can of paint with respect to the surface upon which it is being positioned to ensure that an upper edge of the paint can is horizontally orientated. A general device for holding objects, particularly those having a cylindrical shape, is found in U.S. Pat. No. 4,395,013.

While these devices fulfill their respective, particular objectives and requirements, the need remains for a device for supporting a can of paint above a floor surface so that it may be easily accessible by a person who is standing. Further, the device preferably has an adjustable height so that a person standing on a ladder may also access it. The device should further include means for ensuring that the paint can is firmly held within the device.

SUMMARY OF THE INVENTION

The present invention meets the needs presented above by generally comprising a post that has a top end and a bottom end. A support assembly is attached to the post adjacent to the bottom end and is configured to support the post in a vertical orientation. A housing has a bottom wall and a peripheral wall that is attached to and extends upwardly from the bottom wall. The peripheral wall has an upper edge defining an opening into the housing and the bottom wall is attached to the top end of the post. A paint can is positioned in the housing and abutted against the bottom wall so that the paint can is supported above a ground or floor surface.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
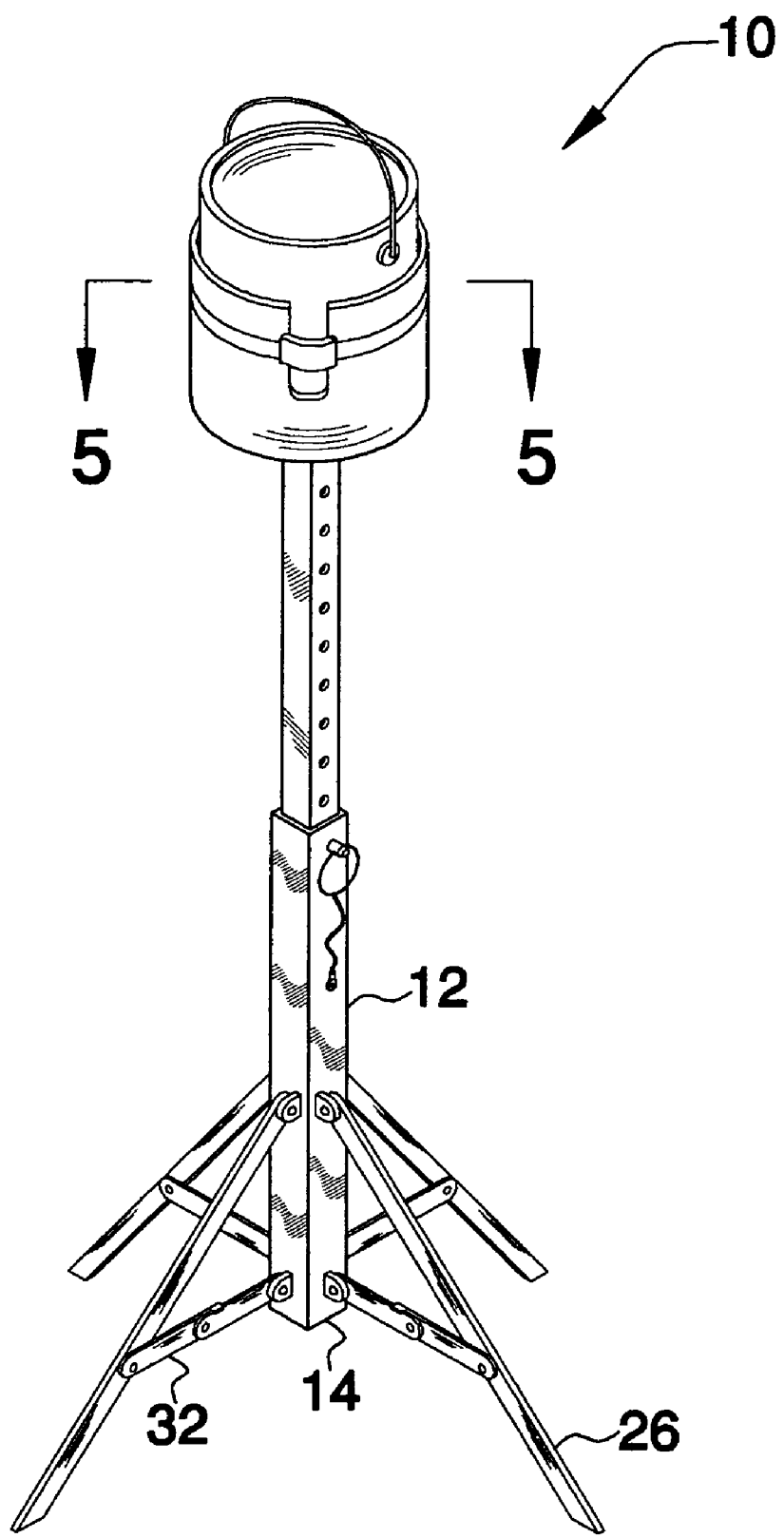
FIG. 1 is a perspective view of a paint can support apparatus and method according to the present invention.
Figure 2:
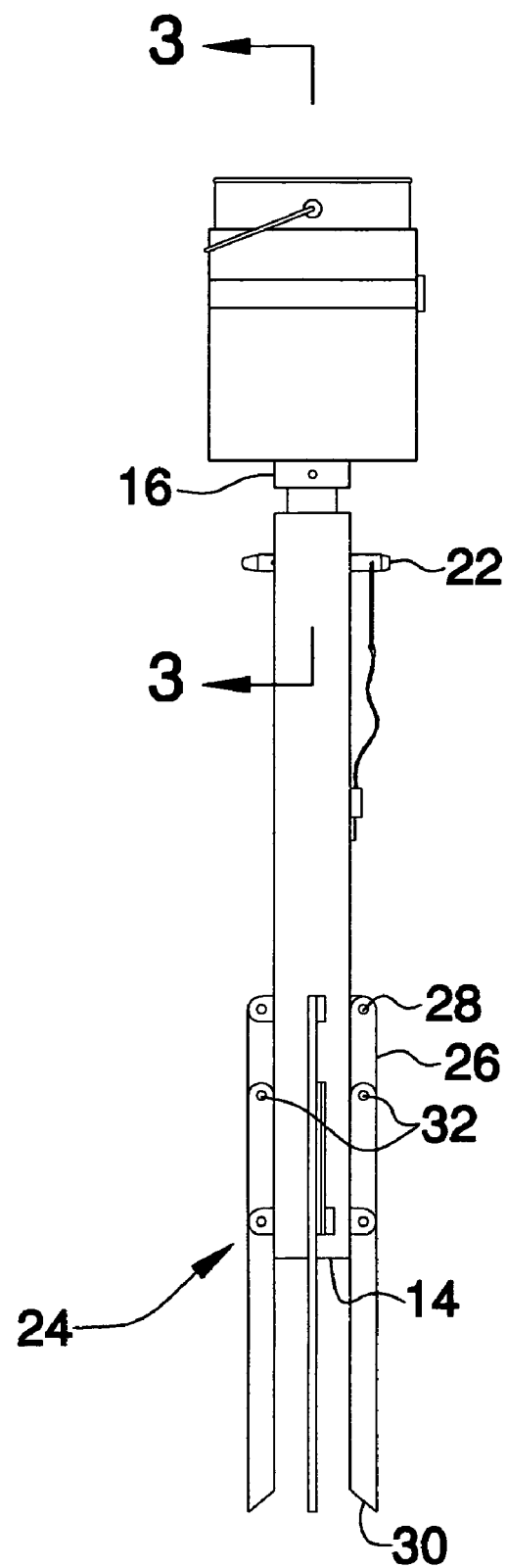
FIG. 2 is a side view of the present invention.
Figure 3:
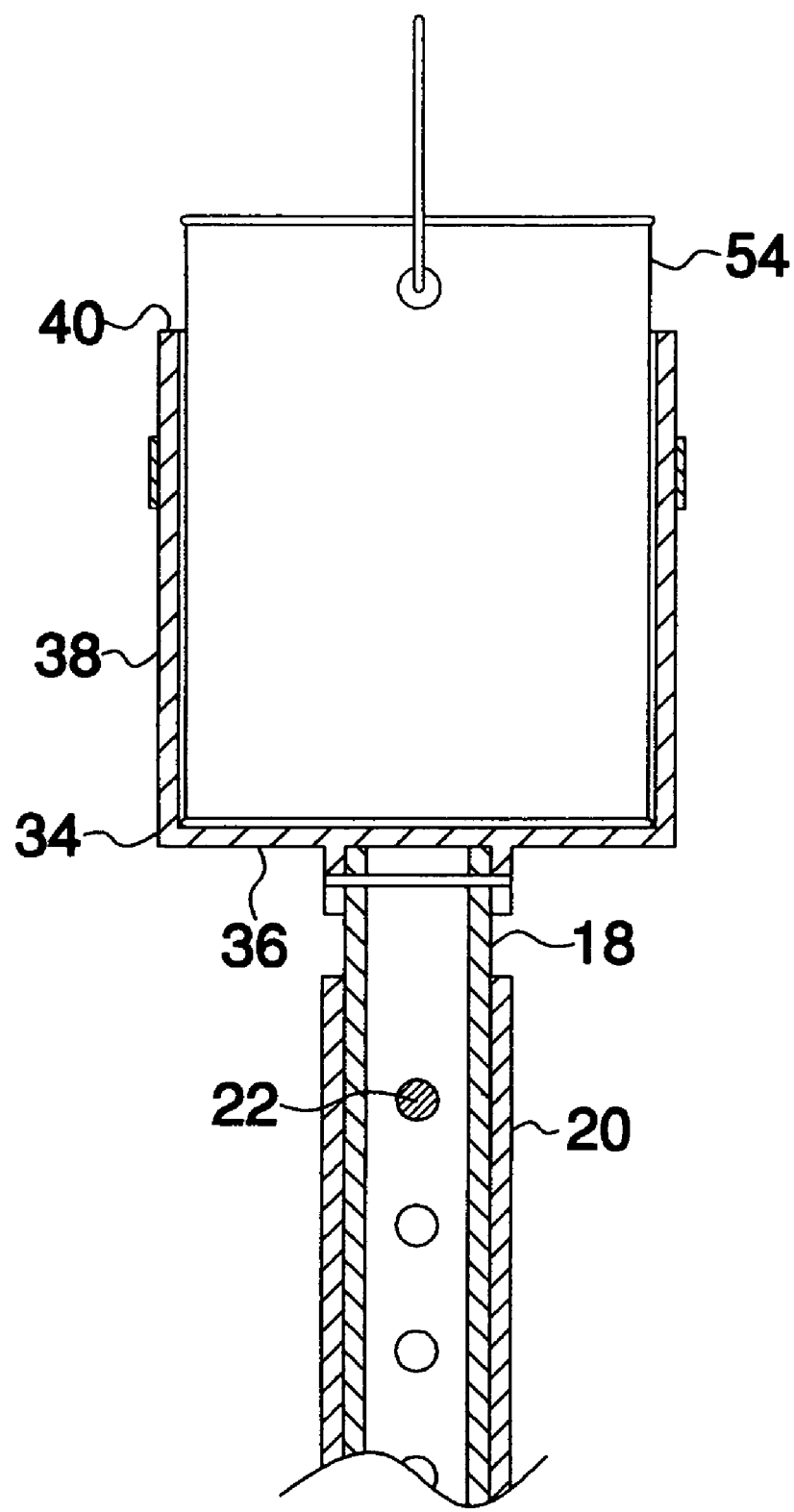
FIG. 3 is a cross-sectional view taken along line 3-3 of FIG. 2 of the present invention.
Figure 4:
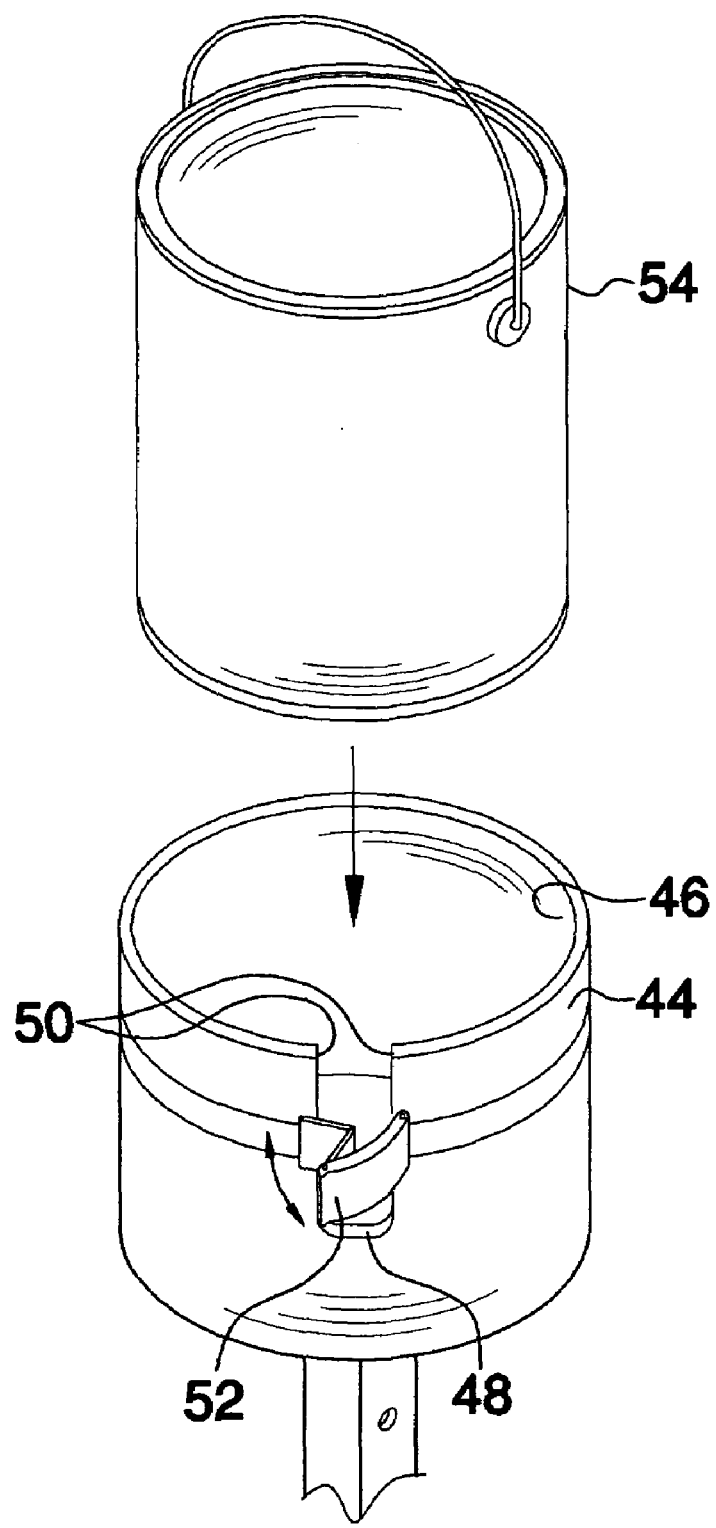
FIG. 4 is a perspective view of the present invention.
Figure 5:
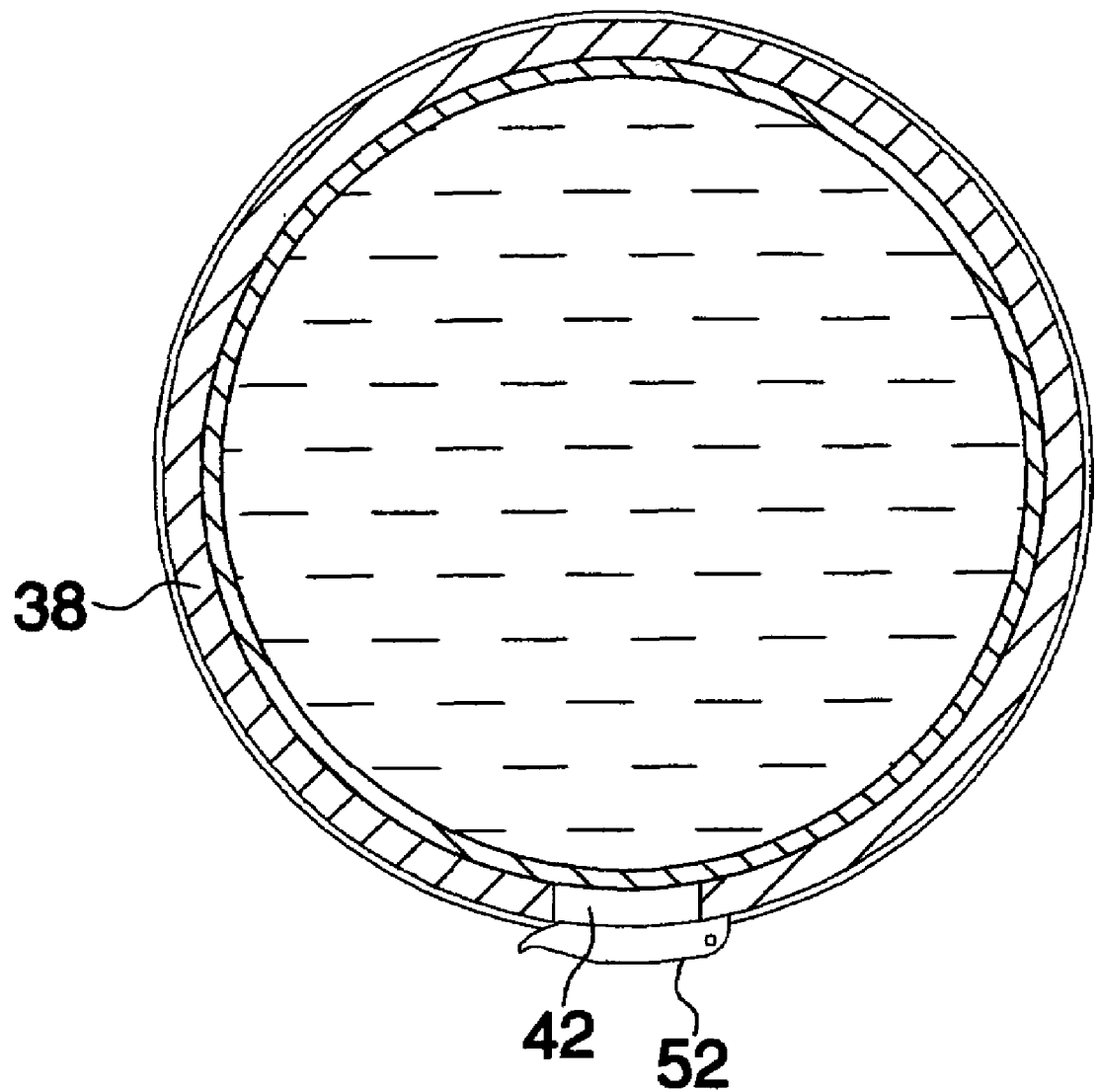
FIG. 5 is a cross-sectional view taken along line 5-5 of FIG. 1 of the present invention.

With reference now to the drawings, and in particular to FIGS. 1 through 5 thereof, a new paint can holding device embodying the principles and concepts of the present invention and generally designated by the reference numeral 10 will be described.

As best illustrated in FIGS. 1 through 5, the paint can support apparatus 10 and method thereof generally comprises a post 12 that has a top end 14 and a bottom end 16. The post 12 is selectively telescopic and includes a male section 18 that is removably extendable into a female section 20. A height of the post 12 is selectively adjustable. A locking member 22 is configured to selectively lock the male 18 and female 20 sections with respect to each other. The locking member 22 comprises a pin that is removably extendable though the male 18 and female 20 sections.

A support assembly 24 is attached to the post 12 adjacent to the bottom end and is configured to support the post 12 in a vertical orientation. The support assembly 24 comprises a plurality of legs 26. Each of the legs 26 has an attached end 28 attached to the post 12 and a free end 30. The legs 26 are each pivotally coupled to the post 12 and are selectively positioned between a stored position folded against the post 12 or a support position extending downwardly and outwardly from a longitudinal axis of the post 12. The stored position allows for easy storage of the apparatus 10. Braces 32 are attached to the post and each is attached to one of the legs 26 to prevent excessive pivoting between the legs 26 and the post.

A housing 34 has a bottom wall 36 and a peripheral wall 38 that is attached to and extends upwardly from the bottom wall 36. The peripheral wall 38 has an upper edge 40 defining an opening into the housing 34. The bottom wall 36 is attached to the top end 16 of the post 12. The upper edge 40 has a slot 42 extending therein and through an outer surface 44 and an inner surface 46 of the perimeter wall 38. The slot 42 has a bottom edge 48 and a pair of lateral edges 50. A coupler 52 is mounted on the peripheral wall 38 and is configured to selectively urge the lateral edges 50 toward each other to reduce a circumference of the upper edge 40. The coupler 52 is preferably a strap and buckle combination. The bottom wall 36 has a circular shape and having a diameter equal to between 7 inches and 9 inches.

In use, a paint can 54 is provided having conventional dimensions. A height of the post 12 is adjusted so that the housing 34 is at a desired height with respect to a person using it while painting. The paint can 54 is positioned in the housing and is abutted against the bottom wall 36. The coupler 52 is engaged to urge the lateral edges 50 together so that a reduced circumference of the upper edge 40 secures the paint can 54 in the housing 34.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method for supporting a paint can above a floor surface, said method comprising the steps of:
   providing a post having a top end and a bottom end;
   providing a support assembly attached to said post adjacent to said bottom end and being configured to support said post in a vertical orientation;
   providing a housing having a bottom wall and a peripheral wall being attached to and extending upwardly from said bottom wall, said peripheral wall having an upper edge defining an opening into said housing, said bottom wall being attached to said top end of said post, said upper edge having a slot extending therein and through an outer surface and an inner surface of said perimeter wall, said slot having a bottom edge and a pair of lateral edges, a coupler being mounted on said peripheral wall and being configured to selectively urge said lateral edges toward each other to reduce a circumference of said upper edge;
   providing a paint can;
   positioning said paint can in said housing and abutting said paint can against said bottom wall; and
   engaging said coupler and urging said lateral edges together, wherein a reduced circumference of said upper edge secures said paint can in said housing.

2. The method according to claim 1, wherein said post is selectively telescopic and includes a male section being removably extendable into a female section, a height of said post being selectively adjustable, a locking member being configured to selectively lock said male and female sections with respect to each other.

3. The method according to claim 2, wherein said locking member comprises a pin being removably extendable though said male and female sections.

4. The method according to claim 1, wherein said support assembly comprises a plurality of legs, each of said legs having an attached end attached to said post and a free end.

5. The method according to claim 4, wherein said legs are pivotally coupled to said post and being selectively positioned between a stored position folded against said post or a support position extending downwardly and outwardly from a longitudinal axis of said post.

6. A method for supporting a paint can above a floor surface, said method comprising the steps of:
   providing a post having a top end and a bottom end, said post being selectively telescopic and including a male section being removably extendable into a female section, a height of said post being selectively adjustable, a locking member being configured to selectively lock said male and female sections with respect to each other, said locking member comprising a pin being removably extendable though said male and female sections;
   providing a support assembly attached to said post adjacent to said bottom end and being configured to support said post in a vertical orientation, said support assembly comprising a plurality of legs, each of said legs having an attached end attached to said post and a free end, said legs being pivotally coupled to said post and being selectively positioned between a stored position folded against said post or a support position extending downwardly and outwardly from a longitudinal axis of said post;
   providing a housing having a bottom wall and a peripheral wall being attached to and extending upwardly from said bottom wall, said peripheral wall having an upper edge defining an opening into said housing, said bottom wall being attached to said top end of said post, said upper edge having a slot extending therein and through an outer surface and an inner surface of said perimeter wall, said slot having a bottom edge and a pair of lateral edges, a coupler being mounted on said peripheral wall and being configured to selectively urge said lateral edges toward each other to reduce a circumference of said upper edge, said bottom wall having a circular shape and having a diameter equal to between 7 inches and 9 inches;
   providing a paint can;
   adjusting a height of said post;
   positioning said paint can in said housing and abutting said paint can against said bottom wall; and
   engaging said coupler and urging said lateral edges together, wherein a reduced circumference of said upper edge secures said paint can in said housing.

* * * * *